(12) United States Patent
Treyz

(10) Patent No.: US 7,638,046 B2
(45) Date of Patent: Dec. 29, 2009

(54) CARTRIDGE FILTER FOR AIRCRAFT

(75) Inventor: Alain Treyz, Antony (FR)

(73) Assignee: Messier-Bugatti, Velizy Villacoublay (FR)

( * ) Notice: Subject to any disclaimer, the term of this patent is extended or adjusted under 35 U.S.C. 154(b) by 0 days.

(21) Appl. No.: 12/400,365

(22) Filed: Mar. 9, 2009

(65) Prior Publication Data

US 2009/0230047 A1 Sep. 17, 2009

(30) Foreign Application Priority Data

Mar. 14, 2008 (FR) .................................. 08 01409

(51) Int. Cl.
*B01D 27/08* (2006.01)
*B01D 35/30* (2006.01)
*B01D 35/153* (2006.01)

(52) U.S. Cl. ...................... 210/232; 210/234; 210/235; 210/444

(58) Field of Classification Search ................. 210/232, 210/234, 235, 444
See application file for complete search history.

(56) References Cited

U.S. PATENT DOCUMENTS

| 2,878,936 | A | * | 3/1959 | Scavuzzo et al. | ............. | 210/90 |
| 2,932,400 | A | * | 4/1960 | Scavuzzo | .................... | 210/235 |
| 3,080,972 | A | | 3/1963 | Smith | | |
| 3,283,907 | A | | 11/1966 | Whiting | | |
| 5,711,872 | A | | 1/1998 | Jones et al. | | |
| 2004/0217045 | A1 | | 11/2004 | Gruca et al. | | |

* cited by examiner

*Primary Examiner*—Thomas M Lithgow
(74) *Attorney, Agent, or Firm*—Sughrue Mion, PLLC

(57) ABSTRACT

The invention relates to a filter device comprising a hydraulic block (1) receiving a removable filter (2) that is screwed into a first internal thread (8) of the hydraulic block. The hydraulic block receives a retaining member (101) suitable for retaining the filter axially when the filter is screwed to the hydraulic block, the hydraulic block including a second internal thread (8) that is on the same axis as the first internal thread and that receives a fastener member (102) for fastening the retaining member to the hydraulic block, the fastener member being screwed into the second internal thread with toque that is sufficient to prevent the retaining member escaping in service.

5 Claims, 5 Drawing Sheets

CARTRIDGE FILTER FOR AIRCRAFT

The invention relates to a filter device for an aircraft hydraulic circuit.

BACKGROUND OF THE INVENTION

Filter devices for aircraft hydraulic circuits are known that comprise at least one cartridge filter that is separately fitted to a hydraulic block. The filter comprises a vessel that receives a filter cartridge. The vessel is screwed to the hydraulic block and is tightened with torque that is sufficient to ensure that the thread holds together in service, and in particular that avoids any fretting.

Given the dimensions being proposed for aircraft, such vessels are reaching considerable dimensions, and that the tightening torque increases in proportion, thereby leading to various problems. Firstly, delivering such torque requires torque wrenches to be used that are large in size and heavy, difficult to handle, and above all in zones that are sometimes difficult of access in bays of the aircraft. Such wrenches also require the operator to deliver considerable force. Furthermore, such a tightening torque leads to high levels of stress on the internal thread in the hydraulic block. Given the fatigue cycling that is caused by the vessel being screwed on and off, these high levels of stress constitute a risk of the internal thread in the hydraulic block deteriorating. These risks are made worse by the fact that the hydraulic block is generally made of a material such as aluminum or titanium in which internal threads are known to wear rapidly, even when protective treatments are used.

OBJECT OF THE INVENTION

An object of the invention is to provide a filter device that does not present the above-specified drawbacks.

BRIEF SUMMARY OF THE INVENTION

The invention provides a filter device comprising a hydraulic block receiving a removable filter that is screwed into a first internal thread of the hydraulic block. According to the invention, the hydraulic block receives a retaining member suitable for retaining the filter axially when the filter is screwed to the hydraulic block, the hydraulic block including a second internal thread that is on the same axis as the first internal thread and that receives a fastener member for fastening the retaining member to the hydraulic block.

The second internal thread that serves to fasten the retaining member can then be subjected to a high level of tightening since the retaining member is designed to remain permanently attached to the hydraulic block, so this internal thread is not subjected to frequent screwing and unscrewing operations, thus avoiding subjecting it to fatigue degradation. The first internal thread to which the filter is screwed is no longer subjected to a high level of tightening since axial retention of the filter is provided by the retaining member, so the filter does not run any risk of escaping from the hydraulic block, even if it is not screwed tight to the hydraulic block.

This causes the effects of tightening, which involve levels of force that are high but that are applied to a connection that is never undone in service, to be separated from the effects of the vessel being screwed on and off, which now involves a connection that is indeed taken apart frequently in service, but that is subjected to very little force. The two internal threads are thus preserved and can last much longer than an internal thread that is subjected to frequent screwing and unscrewing with high levels of tightening.

Terms such as "axial" and "axially" naturally refer to the axis about which the element for screwing to the hydraulic block 1 is turned during such screwing and unscrewing. Threads that are on the same axis, one after the other, can be said to be coaxial.

In a preferred arrangement, the internal thread that receives the fastener member is the same as the internal thread that receives the filter, with the fastener member being received in the inner end of the internal thread, while the filter is screwed into its entry. Thus, a single internal thread serves to perform both the function of fastening the retaining member and the function of receiving the filter, thereby simplifying design of the hydraulic block.

BRIEF DESCRIPTION OF THE DRAWINGS

The invention can be better understood in the light of the following description with reference to the figures of the accompanying drawings, in which.

DETAILED DESCRIPTION OF THE INVENTION

Figure 1:
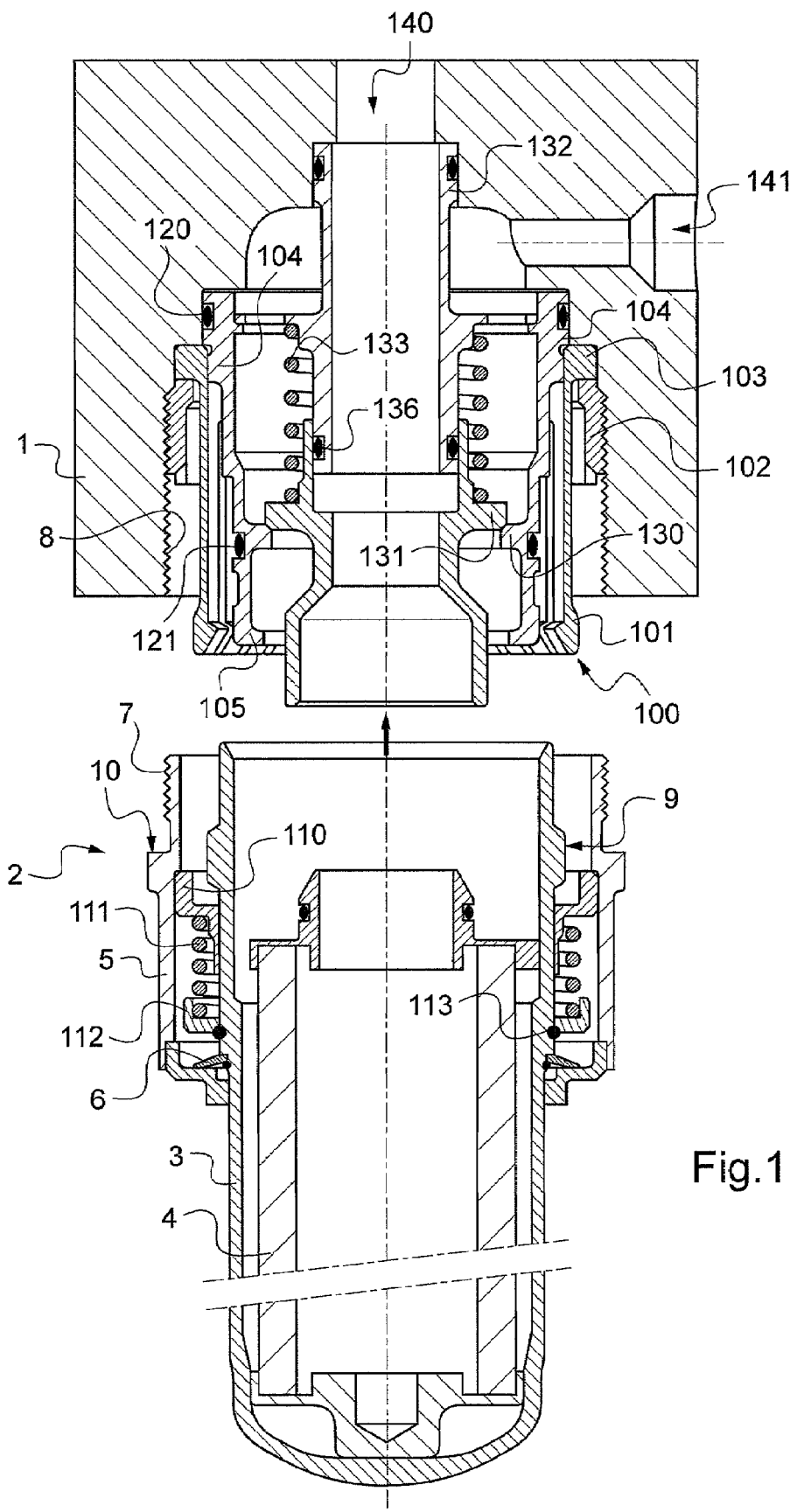
FIG. 1 is a section view of the filter device in a particular embodiment of the invention, the filter being about to be screwed to the hydraulic block.

FIG. 1 shows a hydraulic block 1 having a hydraulic filter 2 fitted thereto. The filter 2 comprises a vessel 3 that receives a filter cartridge 4 that needs to be changed regularly. The filter is thus designed to be removable.

The filter 2 includes a bushing 5 that extends around the vessel 3 and that is held axially relative thereto by a spring washer 6. Nevertheless, the spring washer 6 does not prevent the bushing 5 from turning relative to the vessel 3. The bushing 5 includes an external thread 7 designed to be screwed into an internal thread 8 of the hydraulic block 1.

A retaining member 100 serves to retain the filter 2 axially when it is screwed to the hydraulic block 1. The retaining member 100 includes a catch 101 that is fastened to the body by a nut 102 screwed tight into the inner end of the internal thread 8, with sufficient torque being used to ensure good mechanical behavior of the thread in service, and in particular to avoid any fretting, and thus in practice with torque at a high level. In known manner, the catch 101 comprises a plurality of flexible fingers each terminated by a respective hook for co-operating with a step 9 on the vessel 3. The catch 101 has a base 103 that is pressed against a shoulder of the hydraulic block 1 and that projects from said shoulder in such a manner as to retain a guide 104 in a coaxial cavity in the hydraulic block 1. The guide 104 has a circularly cylindrical wall 105 that extends to receive and guide axially the end of the vessel 3 that covers the guide wall 104 while the filter is being put into place on the hydraulic block 1. The guide wall 105 extends facing the fingers of the catch 101.

For its part, the filter is fitted with a latch 110 in the form of a stepped ring that slides on the outside of the vessel 3 and that is designed, once the filter is in place, to prevent the fingers of the catch 101 splaying apart and releasing the filter 2 axially. The latch 110 is thrust by a spring 111 that bears against a cup 112 held in place on the vessel 3 by a ring 113. When the filter 2 is not mounted on the hydraulic block 1, the spring 111 urges the latch 110 so that it bears against a shoulder of the bushing 5 so as to cause the bushing to bear against the spring washer 6, as can be seen in FIG. 1.

Figure 2:
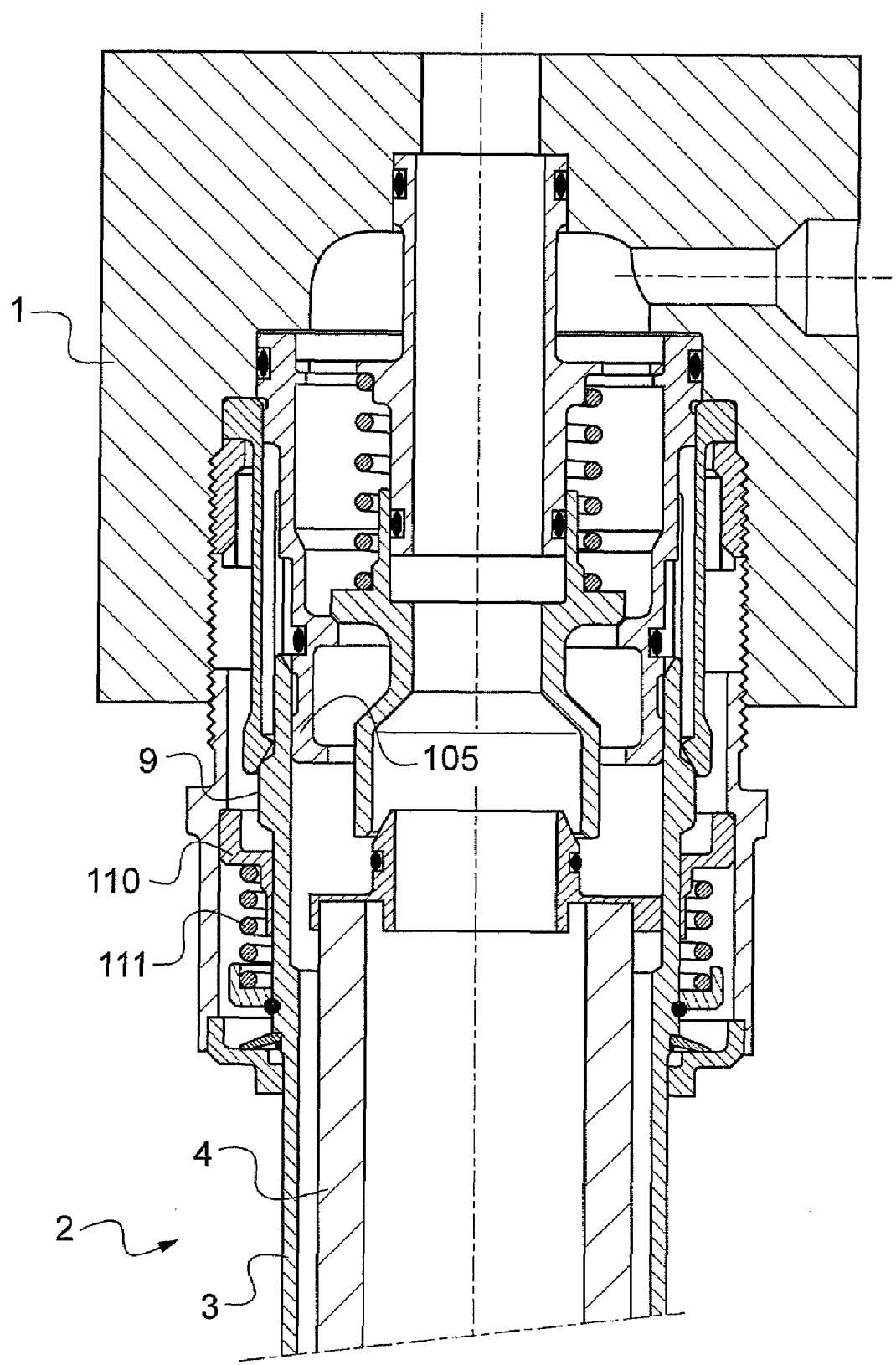
FIGS. 2 and 3 are views analogous to FIG. 1 showing later steps in putting the filter into place on the hydraulic block.

There follows a detailed description of how the filter is put into place on the hydraulic block 1. Firstly, as shown in FIG. 2, the filter is moved up to the hydraulic block 1 and the bushing 5 starts to be screwed into the internal thread 8 of the hydraulic block 1. The vessel 3, that does not turn, then becomes engaged on the guide wall 105 of the guide 104 and is thus guided axially. The bushing 5 continues to be screwed in until the hooks of the fingers of the catch 101 come into abutment against the step 9 on the vessel 3.

Figure 3:
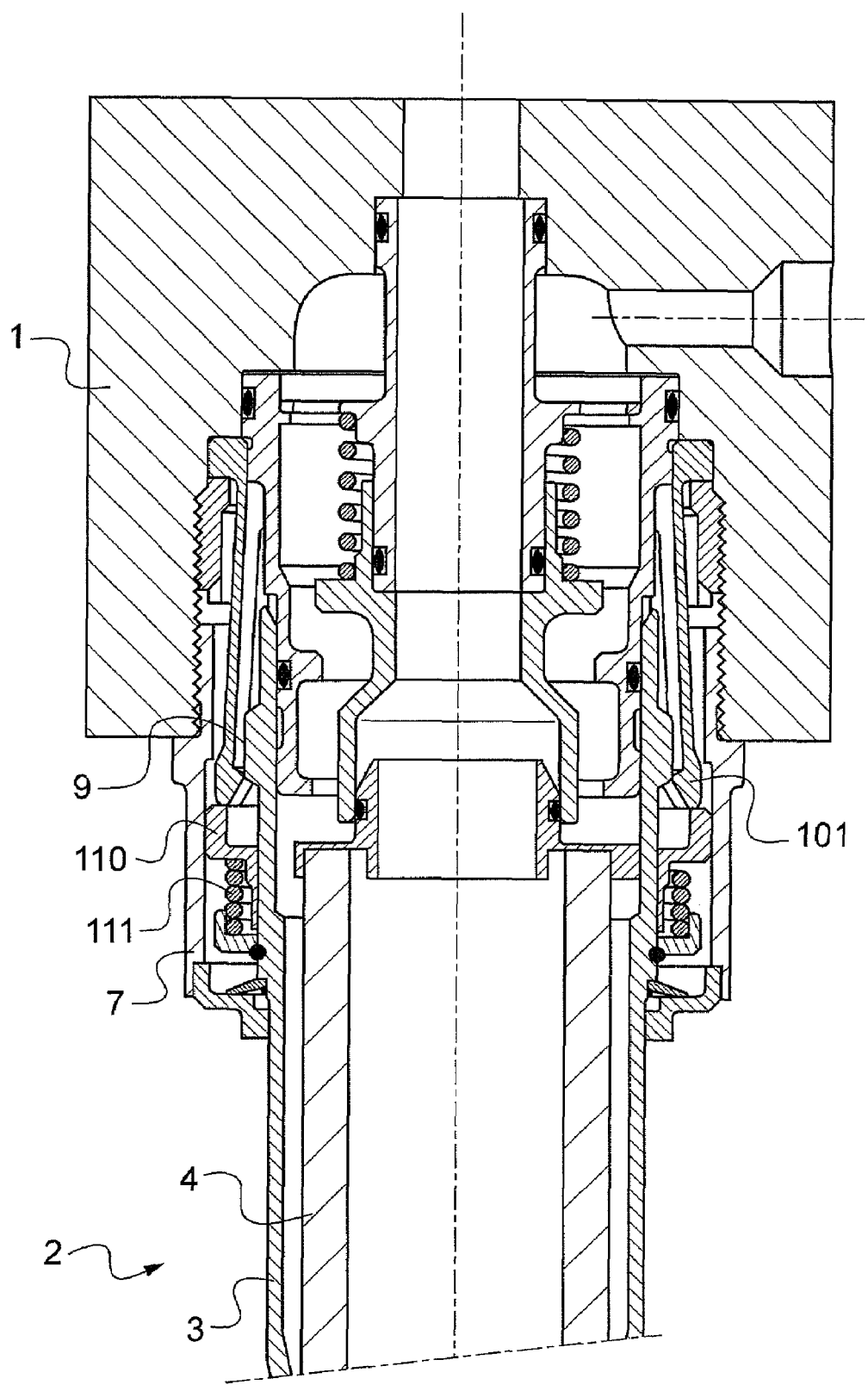

Thereafter, by continuing to screw in the bushing, as shown in FIG. 3, the fingers of the catch are caused to splay apart, thereby allowing the step 9 to go past, while forming an obstacle against which the latch 110 comes into abutment. Continued screwing in of the bushing then causes the spring 111 to be compressed, since the latch 110 can no longer accompany the vessel 3 in its axial advance.

Figure 4:
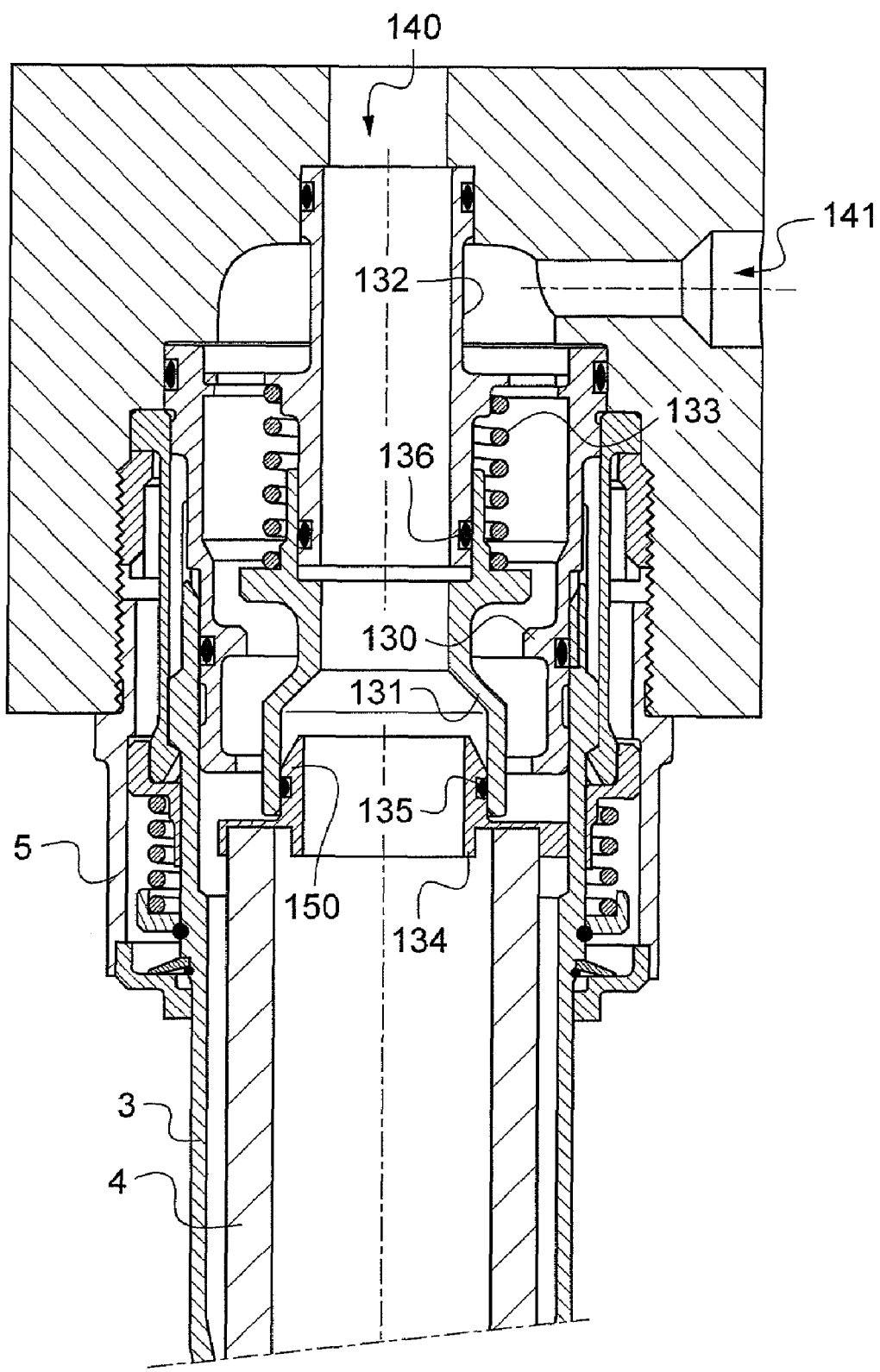
FIG. 4 is a view analogous to FIG. 1 showing the filter in place on the hydraulic block.

As shown in FIG. 4, once the step 9 has gone past the hooks of the catch 101, the fingers of the catch 101 return to a non-splayed position such that the end hooks hold the step 9 captive, thereby allowing the latch 110 under thrust from the spring 111 to surround the hooks of the catch 101, so that the hooks of the catch can no longer splay apart. The filter 2 is then held axially relative to the hydraulic block 1. All that then remains to be done, is to finish screwing in the bushing 5 so that its step 10 comes into abutment against the hydraulic block 1. A small amount of tightening suffices.

It should be observed that in this position, the spring washer 6 bends and thus absorbs the axial assembly clearance needed for putting the filter into place on the hydraulic block 1.

Even if the bushing 5 were to be come unscrewed in service, the filter vessel 3 would continue to be held axially by the catch 101, and the bushing 5 would be stopped axially by the latch 110 against which it would come into abutment. There is thus no risk of the filter escaping in service.

It should be observed at this point that the internal thread 8 of the hydraulic block 1 receives the nut 102 for fastening the catch 101 of the retaining member 100. The nut 102 is screwed tight into the end of the internal thread, thereby inducing high levels of force in the internal thread. Nevertheless, the nut 102 is normally never removed in service. At the entry to the same internal thread 8, the bushing 5 is screwed in to form a connection that is subjected to numerous screwing and unscrewing operations in service. Nevertheless, the bushing 5 is tightened only lightly, such that these numerous screwing and unscrewing operations do not run the risk of damaging the internal thread 8.

It should be observed that the connection between the hydraulic block 1 and the filter 2 is sealed firstly by a gasket 120 placed between the guide base 104 and the hydraulic block 1, and secondly by a gasket 121 placed on the guide wall 105 to co-operate with the vessel 3. These two gaskets prevent any leakage of hydraulic fluid to the outside, in particular over the retaining member 100.

To remove the filter 2, it suffices to unscrew the bushing 5. The bushing begins by entraining the latch 110 downwards, compressing the spring 111. Once the latch has moved down far enough, it disengages from the hooks of the catch and then comes into abutment against the cup 112 that, by pressing against the ring 113, contributes to moving the vessel 3 downwards. Under thrust from the spring, the vessel 3 continues to move down so that its step 9 pushes the hooks of the catch 101 apart. It then suffices to continue unscrewing the bushing until the filter 2 is separated from the hydraulic block 1.

In a particular aspect of the invention, the guide 104 also forms a seat 130 for a valve member 131 mounted to slide axially on a coaxial column 132 with a gasket 136 interposed between them. As can be seen in FIG. 1, the valve member 131 is urged against the seat 130 by a spring 133. The valve member 131 and the column 132 are hollow and thus define a first hydraulic path leading from inside the cartridge 4 to a first port 140 of the hydraulic block 1. The outside of the valve member 131 and the outside of the column 132 together define a second hydraulic path leading to a second port 141 of the hydraulic block 1, this path being closed when the valve member 131 bears against the seat 130.

As can be seen in FIG. 4, when the filter 2 is in place on the hydraulic block 1, the valve member 131 is pushed back against the spring 133 by a cap 134 covering the cartridge 4 and including a head 150 with a gasket 135 that engages in leaktight manner in the recess in the valve member 131. This serves to make the following connections:

the inside of the cartridge 4 with the first port 140 via the insides of the valve member 131 and of the column 132; and the outside of the cartridge 4 with the second port 141 via the outsides of the valve member 131 and of the column 132, the valve member 131 being spaced apart from the seat 130.

When the filter 2 is removed form the hydraulic block 1, the valve member 131 is urged against the seat 130 so that the valve member 131 prevents fluid coming from the second port 141 flowing to the outside.

The invention is not limited to the above description, but on the contrary covers any variant coming within the ambit defined by the claims.

Figure 5:
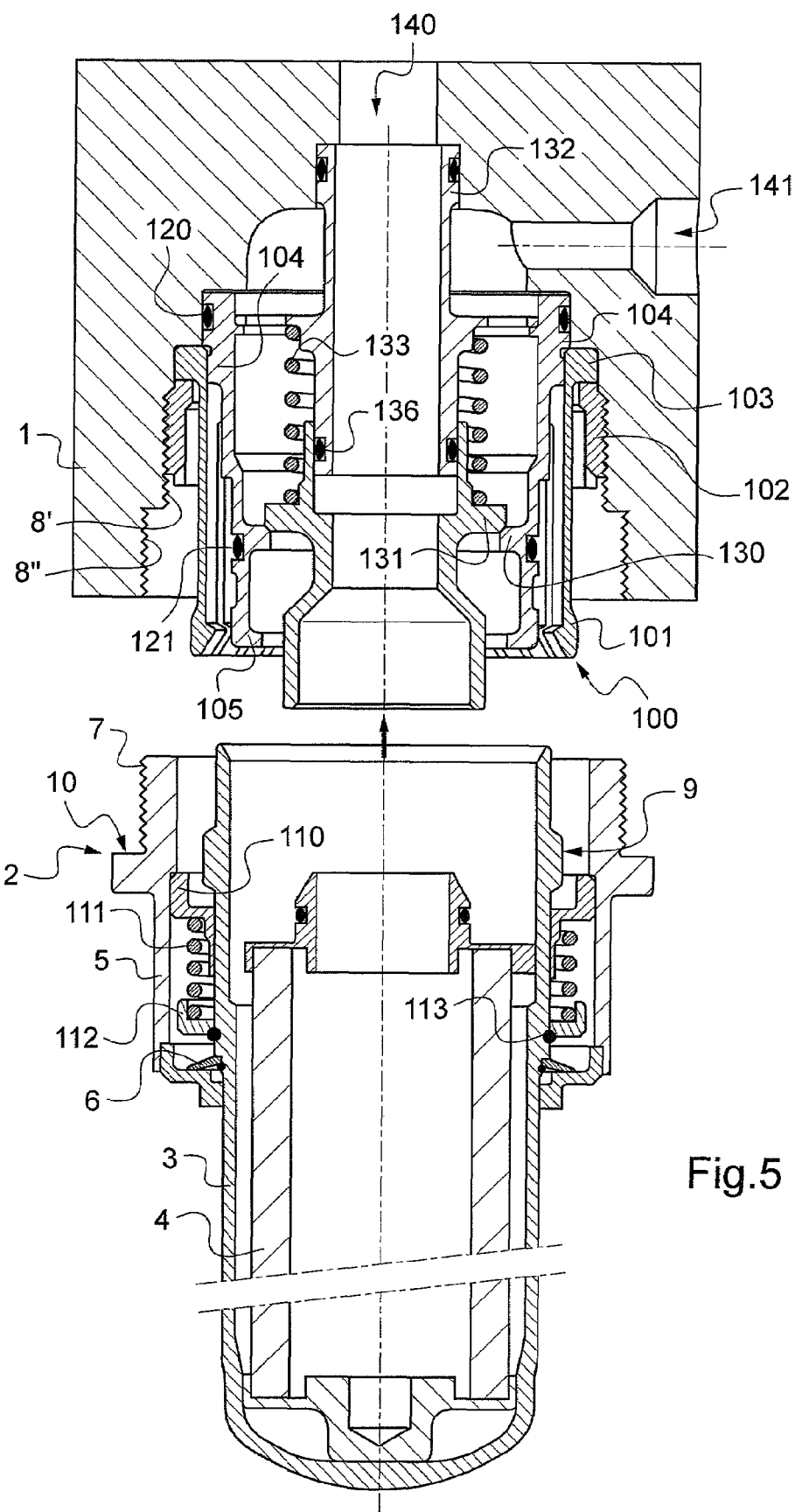
FIG. 5 is a view analogous to FIG. 1 showing a variant embodiment.

In particular, although a filter device is shown in which the internal thread that receives the nut for fastening the retaining means and the internal thread that receives the filter are the same thread, it is possible to provide two distinct internal threads, placed one after the other along a common axis and presenting different diameters. Such a disposition is shown in FIG. 5 where there can be seen two distinct threads 8' and 8".

Furthermore, although a fastener member (the nut 102) is shown that is distinct from the retaining member (the catch 101), it is possible to make provision for the retaining member and the fastener member to comprise a single part, such that it is the retaining member that is screwed to the hydraulic block. Furthermore, although the retaining member is shown as comprising a catch, it is possible to envisage using any other axial retaining member, such as, for example, a member having pawls, segments, or any other equivalent embodiment.

What is claimed is:

1. A filter device comprising a hydraulic block (1) receiving a removable filter (2) that is screwed into a first internal thread (8, 8') of the hydraulic block, wherein the hydraulic block receives a retaining member (101) suitable for retaining the filter axially when the filter is screwed to the hydraulic block, the hydraulic block including a second internal thread (8; 8") that is on the same axis as the first internal thread and that receives a fastener member (102) for fastening the retaining member to the hydraulic block.

2. A filter device according to claim 1, wherein the first internal thread and the second internal thread form respectively the entry and the inner end of a single internal thread (8).

3. A filter device according to claim 1, wherein the retaining member comprises a catch (101) disposed to co-operate with a step (9) of a vessel for the filter (2) when the filter is in position on the hydraulic block (1).

4. A filter device according to claim 3, wherein the catch (101) includes a base that comes to bear against a shoulder of the hydraulic block (1), the fastener member including a nut (102) that holds the catch stationary against said shoulder.

5. A filter device according to claim 3, wherein the filter includes a bushing (5) mounted to turn relative to the vessel, the bushing having an external thread enabling it to be engaged in the first internal thread of the hydraulic block such that while the filter is being put into place on the hydraulic block, the bushing is turned for screw-fastening purposes while the vessel does not turn.

* * * * *